United States Patent [19]
Kado

[11] Patent Number: 5,419,042
[45] Date of Patent: May 30, 1995

[54] METHOD FOR TEMPORARILY ASSEMBLING A HEAT EXCHANGER

[75] Inventor: Hirotaka Kado, Isesaki, Japan

[73] Assignee: Sanden Corporation, Isesaki, Japan

[21] Appl. No.: 309,788

[22] Filed: Sep. 21, 1994

Related U.S. Application Data

[63] Continuation of Ser. No. 936,220, Aug. 27, 1992, abandoned, which is a continuation-in-part of Ser. No. 735,276, Jul. 24, 1991, abandoned.

[30] Foreign Application Priority Data

Jul. 24, 1990 [JP] Japan .................. 2-194082

[51] Int. Cl.⁶ ............................ B23P 15/00
[52] U.S. Cl. ................. 29/890.052; 29/515; 29/890.054
[58] Field of Search ............ 29/890.052, 890.054, 29/890.053, 890.14, 515; 285/91, 81, 354, 355

[56] References Cited

U.S. PATENT DOCUMENTS

| | | | |
|---|---|---|---|
| 1,896,371 | 2/1933 | Quarnstrom | 29/515 |
| 3,476,414 | 11/1969 | Condrac | 285/354 |
| 3,922,768 | 12/1975 | Takayasu | 29/515 |
| 4,287,650 | 9/1981 | Fisher et al. | 29/515 |
| 4,620,590 | 11/1986 | Koisuka et al. | |
| 4,887,853 | 12/1989 | Flowers et al. | 285/287 |
| 4,911,484 | 3/1990 | Hackforth | 29/515 |

FOREIGN PATENT DOCUMENTS

| | | | |
|---|---|---|---|
| 0094740 | 7/1980 | Japan | 29/515 |
| 58-96986 | 6/1983 | Japan | |
| 2054779 | 7/1979 | United Kingdom | |
| 1444807 | 11/1971 | U.S.S.R. | 29/515 |

*Primary Examiner*—Irene Cuda
*Attorney, Agent, or Firm*—Baker & Botts

[57] ABSTRACT

A heat exchanger, such as a condenser for use in an automobile air conditioning system includes inlet and outlet union elements. Each inlet and outlet union element includes a union joint and a pipe member having one end secured to a header pipe. The other end of the pipe member is temporarily connected to the union joint before a brazing process of the condenser is carried out. Couplers are provided to effect the temporary connection.

5 Claims, 7 Drawing Sheets

METHOD FOR TEMPORARILY ASSEMBLING A HEAT EXCHANGER

This application is a continuation of application Ser. No. 07/936,220, filed Aug. 27, 1992 now abandoned, which is a continuation-in-part of application Ser. No. 07/735,276, filed Jul. 24, 1991, now abandoned.

BACKGROUND OF THE INVENTION

1. Field of the Invention

The present invention relates to a heat exchanger, such as a condenser for use in an automobile air conditioning system, and the assembly thereof.

2. Description of the Prior Art

Japanese Utility Model Application No. 63-142586 discloses a heat exchanger, such as a condenser for use in an automobile air conditioning system as substantially illustrated in FIG. 1.

The condenser includes a plurality of adjacent, essentially flat tubes 10 each having a flat oval cross section and a pair of open ends which allow a refrigerant fluid to flow therethrough. A plurality of corrugated fin units 12 are disposed between adjacent flat tubes 10. The corrugated fin units 12 have a clad construction. Corrugated fin units 12 are brazed to flat tubes 10 to form heat exchange region 100 as discussed below. Heat exchange region 100 allows air to flow therethrough in a perpendicular direction as illustrated by arrow A.

A pair of cylindrical header pipes 120 and 140 each having opposite open ends are disposed perpendicular to both the flat tubes 10 and arrow A. Cylindrical header pipes have a clad construction. The opposite open ends of header pipes 120 and 140 are fixedly and hermetically plugged by respective caps 121, 122, 141 and 142 by brazing. Plate 110, having a generally U-shaped cross section, is fixedly disposed on an upper end of heat exchanger region 100. The ends of plate 110 are fixedly connected to an inside region of an outer peripheral surface of the uppermost portion of header pipes 120 and 140 by brazing. Plate 111, also having a generally U-shaped cross section, is fixedly disposed on a lower end of heat exchange region 100. The ends of plate 111 are fixedly connected to the inside region of an outer peripheral surface of the lowermost portion of header pipes 120 and 140 in the same manner as plate 110. Plates 110 and 111 reinforce the structural strength of the condenser.

Opening 123, having a diameter slightly greater than the outer diameter of cylindrical inlet pipe 22', is formed at an upper portion of header pipe 120. An inlet pipe 22' is provided with an interior portion that is inserted into opening 123 and an exterior portion extending therefrom. The interior portion of inlet pipe 22' is fixedly and hermetically connected to header pipe 120 by a first brazing process. A conventional union joint 23' is provided at an exterior end of inlet pipe 22'. Union joint 23 is fixedly and hermetically connected to inlet pipe 22' by a second brazing process which is done by hand.

An opening (not shown), having a diameter slightly greater than the outer diameter of cylindrical outlet pipe 32', is formed at a lower portion of header pipe 140. Inlet pipe 32' is provided with an interior portion that is inserted into the opening and an exterior portion extending therefrom. The interior portion of outlet pipe 32' is then fixedly and hermetically connected to header pipe 140 in the same manner as inlet pipe 22' is connected to header pipe 120. A conventional union joint 33' is provided at an externally end of outlet pipe 32'. Union joint 33' is fixedly and hermetically connected to outlet pipe 32' in the same manner as union joint 23'. The exterior portions of inlet pipe 22' and outlet pipe 32, protrude from header pipes 120 and 140, respectively, in opposite directions. Inlet pipe 22' and outlet pipe 32' protrude in a plane perpendicular to the flow of air through heat exchange region 100.

Referring to FIGS. 2 and 3, union joint 33' includes hexagonal prism section 331 and cylinder section 332. As illustrated in FIG. 2, cylinder section 332 axially projects from a detail end surface of hexagonal prism section 331. Male screw portion 332a is formed generally along the entire length of an outer peripheral surface of cylinder section 332. Union joint 33' is provided with circular hole 333 axially and centrally bored therethrough. Circular hole 333 includes large diameter portion 333a and small diameter portion 333b which is concentric with large diameter portion 333a. The large diameter portion 333a of circular hole 133 is open at a proximal end surface of hexagonal prism section 331. The small diameter portion 333b of circular hole 333 is open at the distal end surface of cylinder section 332. A boundary between large diameter portion 333a and small diameter portion 333b is located inside of hexagonal prism section 331 near the distal end of hexagonal prism section 331. Annular ridge 334 is formed at the boundary. An inner diameter of large diameter portion 333a is slightly greater than an outer diameter of outlet pipe 32'.

The construction of union joint 23' is identical to the construction of union joint 33'. Therefore, an explanation of the construction of union joint 23' is omitted.

The flat tubes, fin units, header pipes, caps, plates, and inlet and outlet pipes are all temporarily assembled with one another, at the same time in preparation for the first brazing process. After the temporary assembly process is completed, the above elements are transported from an assembly line to a furnace so as to braze the above elements together as described above.

After the first brazing process is completed, the exterior ends of inlet and outlet pipes 22' and 32' are temporarily connected to union joints 23' and 33, respectively, and are then fixedly and hermetically connected to one another in the second brazing process. The manner of temporarily connecting the exterior end of outlet pipe 32' to union joint 33' is identical to the manner of temporarily connecting the exterior end of inlet pipe 22' to union joint 23'. Therefore, only the manner of temporarily connecting the exterior end of outlet pipe 32' to union joint 33' is representatively described below.

A process of temporarily connecting the exterior end of outlet pipe 32' to union joint 33' is carried out in the following manner. First, the exterior end portion of outlet pipe 32' is inserted into large diameter portion 333a of circular hole 333 until the exterior end surface of outlet pipe 32' contacts annular ridge 334. Since the inner diameter of large diameter portion 333a is slightly greater than the outer diameter of outlet pipe 321, a relative displacement of outlet pipe 32' in large diameter portion 333a may occur before or during the second brazing process. Therefore, in order to prevent the undesirable relative displacement of outlet pipe 331, it is known to use a fastening tool which is temporarily attached to the above half-finished condenser so as to firmly fasten outlet pipe 32' and union joint 33' to each other. The fastening tool is detached from a finished condenser after completion of he second brazing process. However, the steps of attaching the fastening tool to the half-finished condenser and detaching the fastening tool from the finished condenser complicates the manufacturing process of the condenser. Hence, the efficiency of manufacturing the condenser is decreased. In addition, the provision of the fastening tool increases the cost of manufacturing the condenser.

It is also known to utilize a T.I.G. welding (tungsten-insert gas welding) process to temporarily connect outlet pipe 32' to union joint 33' before the second brazing process is carried out in order to prevent the aforementioned defect. However, the T.I.G. welding process requires skilled labor. Hence, the efficiency of manufacturing the condenser is decreased. In addition, the cost of the T.I.G. welding apparatus increases the manufacturing costs of the condenser.

SUMMARY OF THE INVENTION

Accordingly, it is an object of the present invention to provide a heat exchanger which is easy to manufacture and has properly fitted, completely hermetic connections between an inlet pipe and a union joint.

It is a further object of this invention to provide a heat exchanger whose inlet and outlet pipes can be temporarily connected to their respective union joints without any relative sliding motion between the pipes and the union joints.

It is a still further object of the present invention to provide a heat exchanger whose inlet and outlet pipes can be temporarily connected to their respective union joints to prevent any relative sliding motion between the pipes and the union joints, without decreasing the efficiency of manufacturing and without significantly increasing manufacturing costs.

A heat exchanger in accordance with the present invention includes a tubular member for conducting a heat medium therethrough to effect a heat exchange with air outside of the tubular member. The tubular member is provided with an inlet port through which the heat medium enters the tubular member and an outlet port through which the heat medium exits the tubular member. At least one of the inlet and outlet ports includes a pipe member which is secured to the tubular member and a union member.

A method for temporarily assembling the heat exchanger comprises the following steps. First, one of a pair of couplers is provided at an end of the pipe member. Then, the other coupler is provided at the union member. Finally, the end of the pipe member and the union member are temporarily coupled to each other by means of the pair of couplers.

DETAILED DESCRIPTION OF THE PREFERRED EMBODIMENTS

A first embodiment through a sixth embodiment of the present invention are illustrated in FIGS. 4-6, FIGS. 7 and 9, FIG. 8, FIGS. 10 and 11, FIGS. 12 and 13, and FIG. 14, respectively. The overall shape of a heat exchanger, such as a condenser for use in an automobile air conditioning system, is similar to that shown in FIG. 1, so a separate drawing is omitted.

Figure 1:
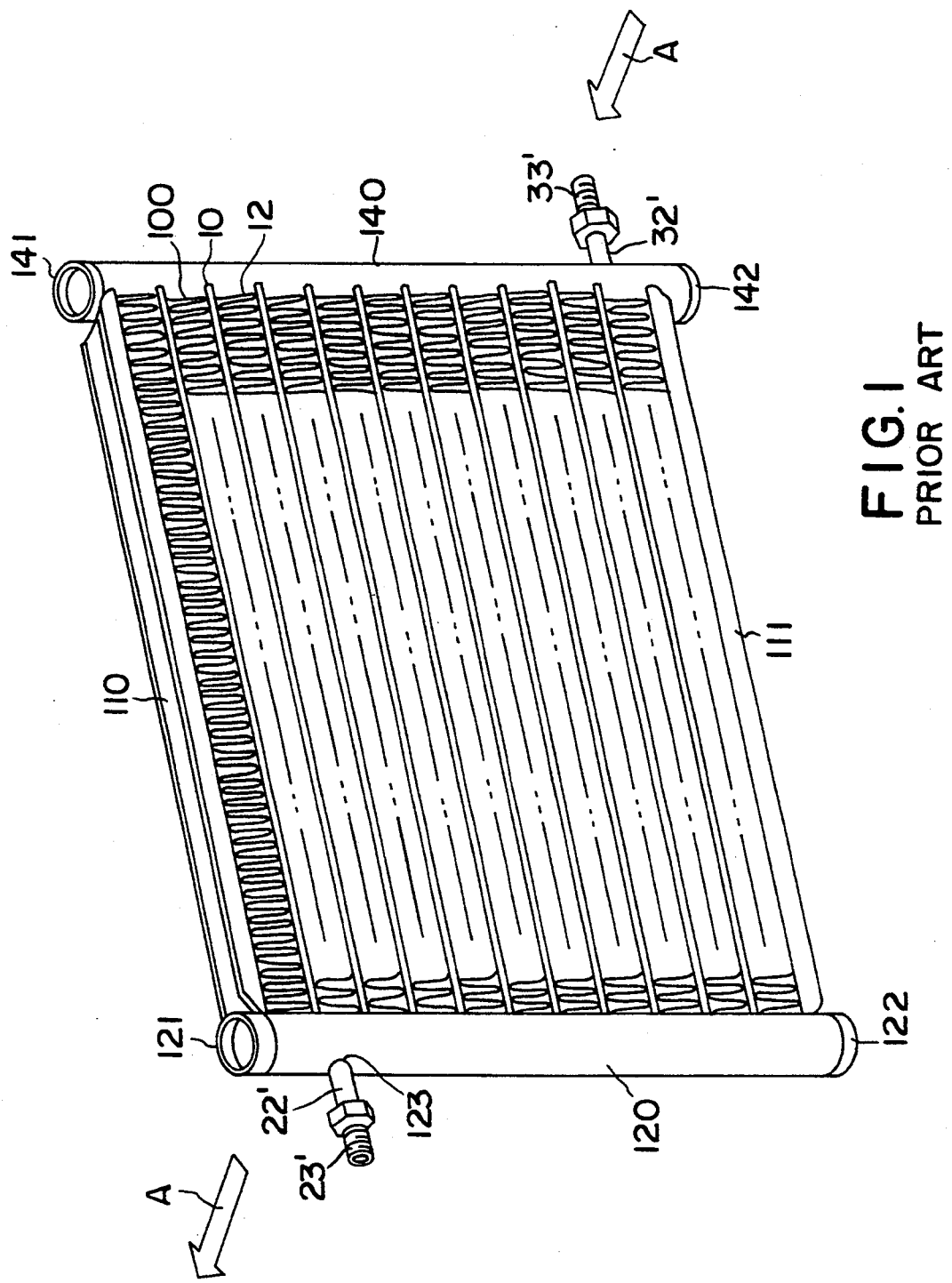
FIG. 1 illustrates a perspective view of a condenser in accordance with one embodiment of the prior art.
Figure 2:
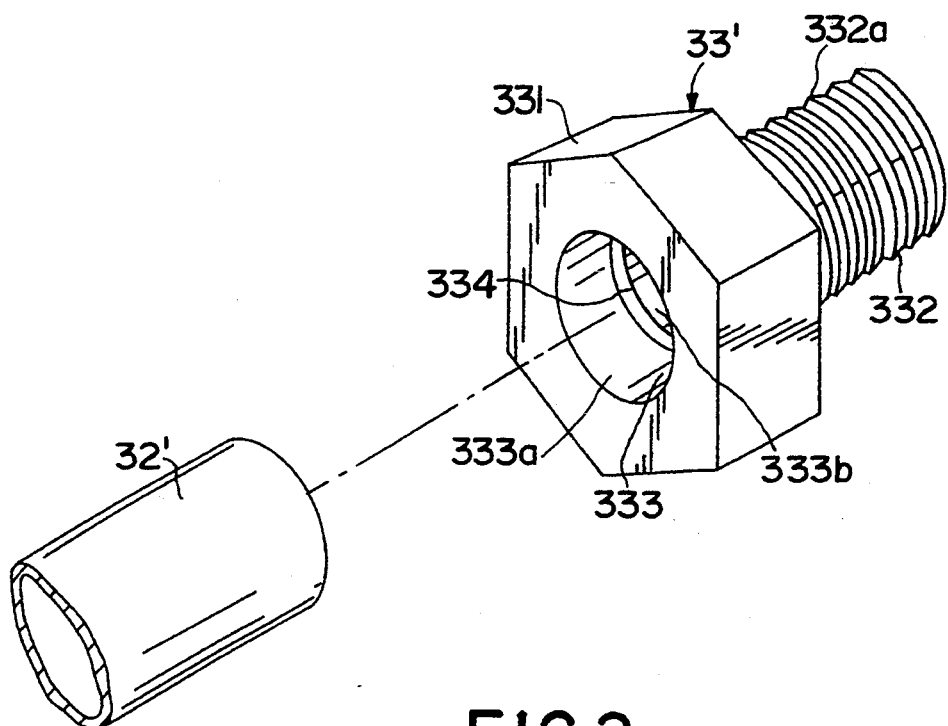
FIG. 2 illustrates a perspective view of an outlet pipe and a conventional union joint of the condenser shown in FIG. 1.
Figure 3:
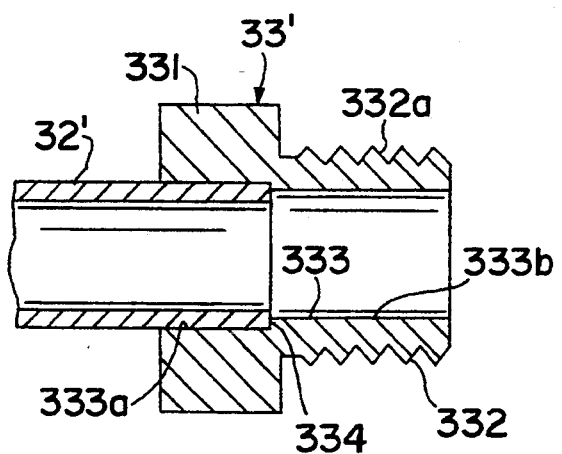
FIG. 3 illustrates a longitudinal sectional view of a combined element of the outlet pipe and the conventional union joint shown in FIG. 2.

In the drawings, the same numerals are used to denote the corresponding elements illustrated in FIGS. 1-3 so that an explanation thereof is omitted. Furthermore, the manner of temporarily connecting the exterior end of an outlet pipe to a union joint is identical to the manner of temporarily connecting the exterior end of an inlet pipe to a union joint. Therefore, only the manner of temporarily connecting the exterior end of the outlet pipe to the union joint is described herein. Finally, the advantages obtained by the first embodiment are substantially similar to the advantages obtained by the other embodiments so that an explanation thereof is omitted.

Figure 4:
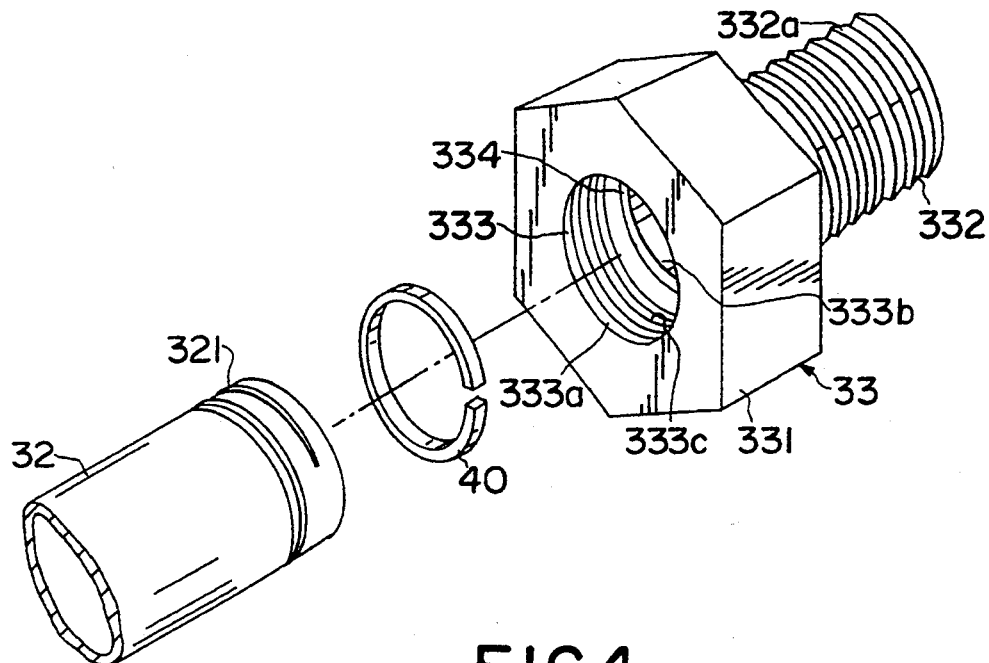
FIG. 4 illustrates an exploded perspective view of a part of a condenser in accordance with a first embodiment of the present invention.
Figure 5:
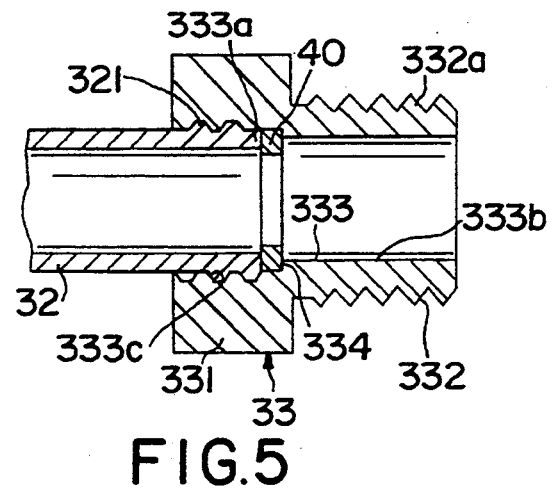
FIG. 5 illustrates a longitudinal sectional view of the part of the condenser shown in FIG. 4.

Referring to FIG. 4, a condenser in accordance with a first embodiment of the present invention includes union joint 33 composed of an aluminum alloy (e.g., AA 7000 series). Union joint 33 includes female screw portion 333c which is threaded at an inner peripheral surface of large diameter portion 333a of circular hole 333. Female screw portion 333c includes two or three screw threads having a relatively large pitch. Outlet pipe 32, composed of an aluminum alloy (e.g., AA 3003), includes male screw portion 32 which is threaded at an outer peripheral surface of the exterior end portion of outlet pipe 32.

Male screw portion 321 is designed to screw into female screw portion 333c. Referring to both FIG. 4 and FIG. 5, a temporary assembly process of the condenser, in particular, a process of temporarily connecting the exterior end of outlet pipe 32 to union joint 33, in accordance with the first embodiment is carried out in the following manner. First, C-shaped member 40 of brazing metal, for example aluminum alloy (AA 4045), is inserted into large diameter portion 333a of circular hole 333 so as to contact with annular ridge 334. Because of its configuration, C-shaped member 40 radially adjusts to the inner diameter of large diameter portion 333a of circular hole 333. Then, male screw portion 321 of outlet pipe 32 screws into female screw portion 333c of union joint 33 so as to firmly sandwich C-shaped member 40 between annular ridge 334 and the exterior end surface of outlet pipe 32. Thus, the process of temporarily connecting the exterior end of outlet pipe 32 to union joint 33 in accordance with the first embodiment is carried out in an uncomplicated manner, in contrast to prior art methods of using a fastening tool or a T.I.G. welding apparatus.

Figure 6:
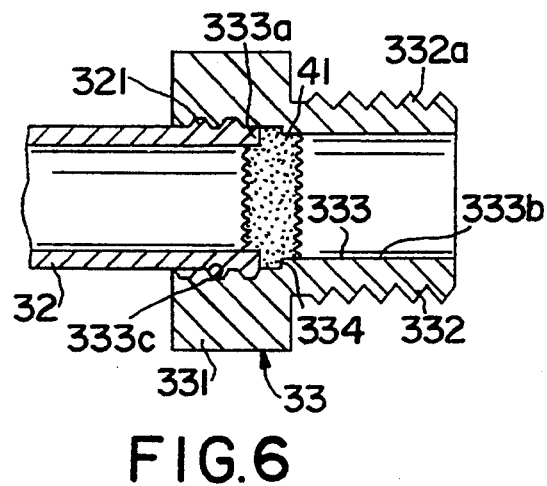
FIG. 6 illustrates the longitudinal sectional view of the part of the condenser shown in FIG. 4 after a brazing process is completed.

The flat tubes, fin units, header pipes, caps, plates, inlet and outlet pipes, and union joints are all temporarily assembled with one another at the same time for a single brazing process. After the temporary assembly process of the condenser is completed, the temporarily assembled condenser is transported from an assembly line to a furnace in which the brazing process is carried out. When the brazing process is completed, brazed portion 41 has formed from the melted C-shaped member as illustrated in FIG. 6. Thus, the exterior end of outlet pipe 32 is brazed to annular ridge 334.

In the second through fifth embodiments, the same sequential processes as in the first embodiment are carried out after temporarily connecting the exterior end of outlet pipe 32 to union joint 33. Therefore, an explanation thereof is omitted hereinafter.

Figure 7:
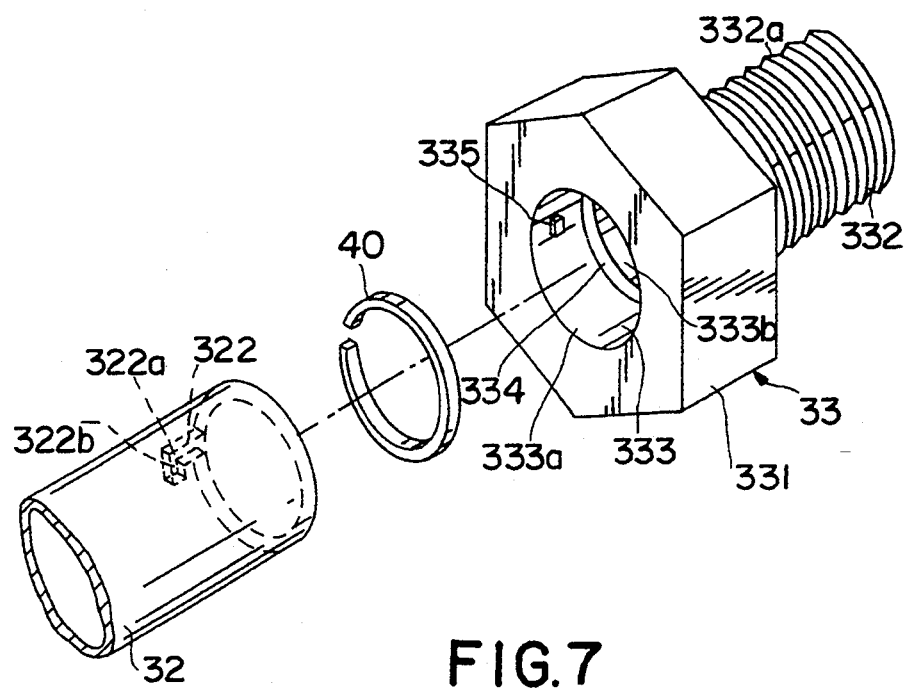
FIG. 7 illustrates an exploded perspective view of a part of a condenser in accordance with a second embodiment of the present invention.

Referring to FIG. 7, a condenser in accordance with a second embodiment of the present invention includes union joint 33 having a small, generally hexahedral-shaped projection 335 formed at an inner peripheral surface of large diameter portion 333a of circular hole 333. Outlet pipe 32 includes L-shaped cut-out portion 322 formed at one end portion thereof. L-shaped cut-out portion 322 comprises axial straight section 322a which is axially cut out from the exterior end surface of outlet pipe 32, and circumferential straight section 322b which is circumferentially cut out from the interior end of axial straight section 322a. The sum of a length of axial straight section 322a and a height of C-shaped member 40 is equal to the distance between annular ridge 334 and the axial outer end surface of small projection 335. The width of L-shaped cut-out portion 322 is designed to snugly receive small projection 335.

Figure 8:
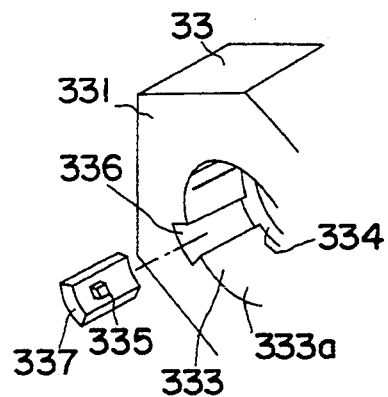
FIG. 8 illustrates an exploded perspective view of a part of a condenser in accordance with a third embodiment of the present invention.

Referring to FIG. 8, a condenser in accordance with a third embodiment of the present invention includes union joint 33 having cut-out portion 336 which is axially cut out of an inner peripheral surface of large diameter portion 333a of circular hole 333 along the length of large diameter portion 333a. Cut-out portion 336 has a truncated fan-shaped cross section. Also provided is chip 337. Chip 337 has a cross section similar to that of cut-out portion 336. Cut-out portion 336 snugly receives chip 337 when chip 337 is inserted thereto. Chip 337 is preferably formed by a forging process. Chip 337 has a small, generally hexahedral-shaped projection 335 formed at an inner surface of chip 337. Thus, when chip 337 is received in cut-out portion 336, union joint 33 has the same configuration as the union joint 33 of the second embodiment.

Figure 9:
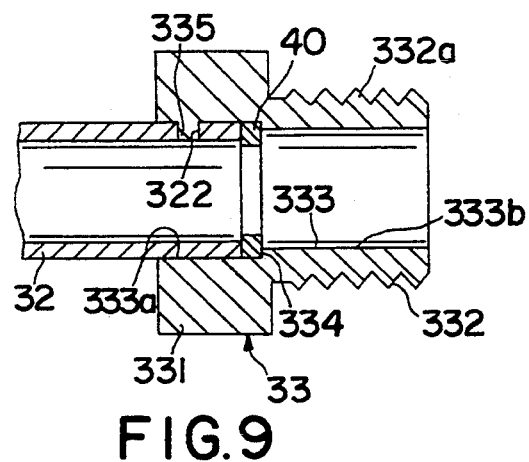
FIG. 9 illustrates a longitudinal sectional view of the part of the condenser shown in FIGS. 7 or 8.

Referring to FIG. 9 in addition to FIGS. 7 and 8, a process of temporarily connecting the exterior end of outlet pipe 32 to union joint 33 in accordance with the second and third embodiments is carried out in the following manner. First, C-shaped member 40 is inserted into large diameter portion 333a of circular hole 333 so as to contact annular ridge 334. This can be accomplished without interference from small projection 335 of union joint 33 by aligning the circumferential vacant portion of C-shaped member 40 with small projection 335. Next, the exterior end portion of outlet pipe 32 is inserted into large diameter portion 333a of circular hole 333 so as to firmly sandwich C-shaped member 40 between annular ridge 334 and the exterior end surface of outlet pipe 32. This is accomplished without interference from small projection 335 of union joint 33 by sliding small projection 335 along axial straight section 322a of L-shaped cut-out portion 322. Finally, union joint 33 is slightly rotated in a clockwise direction so that small projection 335 is received snugly within circumferential straight section 322b of L-shaped cut-out portion 322. Thus, the process of temporarily connecting the exterior end of outlet pipe 32 to union joint 33 in accordance with the second and third embodiments is effected.

Figure 10:
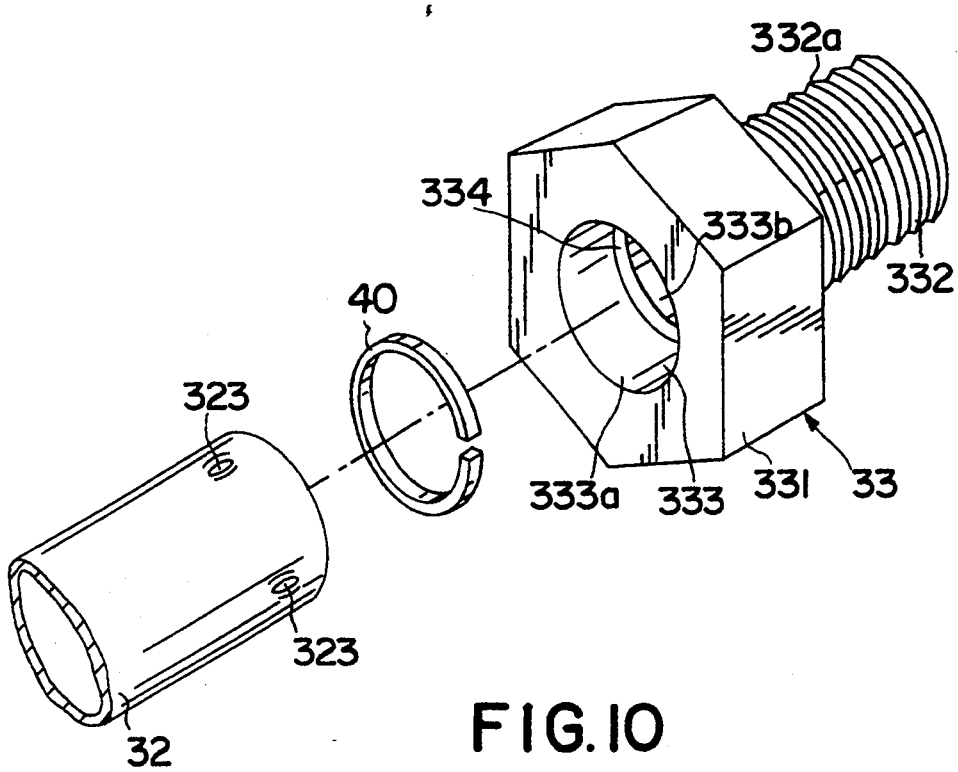
FIG. 10 illustrates an exploded perspective view of a part of a condenser in accordance with a fourth embodiment of the present invention.
Figure 11:
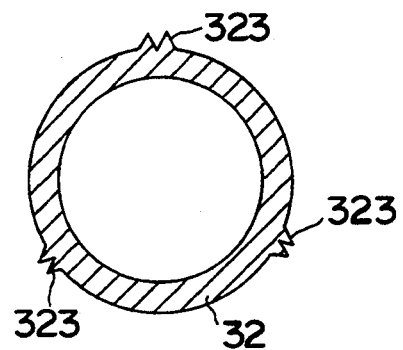
FIG. 11 illustrates a sectional view of a portion of an outlet pipe in accordance with the fourth embodiment shown in FIG. 10.

Referring to FIGS. 10 and 11, a condenser in accordance with a fourth embodiment of the present invention includes outlet pipe 32 having a plurality of small projections 323 which project radially outward from the outer peripheral surface of the exterior end portion of outlet pipe 32. In order to deviate the thickness of outlet pipe 32 radially outward, outlet pipe 32 is preferably pressed to form small projections 323. The small projections are formed at an equiangular interval about the circumference of outlet pipe 32.

A process of temporarily connecting the other end of outlet pipe 32 to union joint 33 in accordance with the fourth embodiment is carried out by the following manner. First, C-shaped member 40 is inserted into large diameter portion 333a of circular hole 333 so as to contact with annular ridge 334. Then, the exterior end portion of outlet pipe 32 is forcibly inserted into large diameter portion 333a of circular hole 333 thereby crushing small projections 323. The crushed small projections provide a frictional fit between the exterior end portion of outlet pipe 32 and the union joint 33. Thus, the process of temporarily connecting the outer end of outlet pipe 32 to union joint 33 in accordance with the fourth embodiment is carried out.

Figure 12:
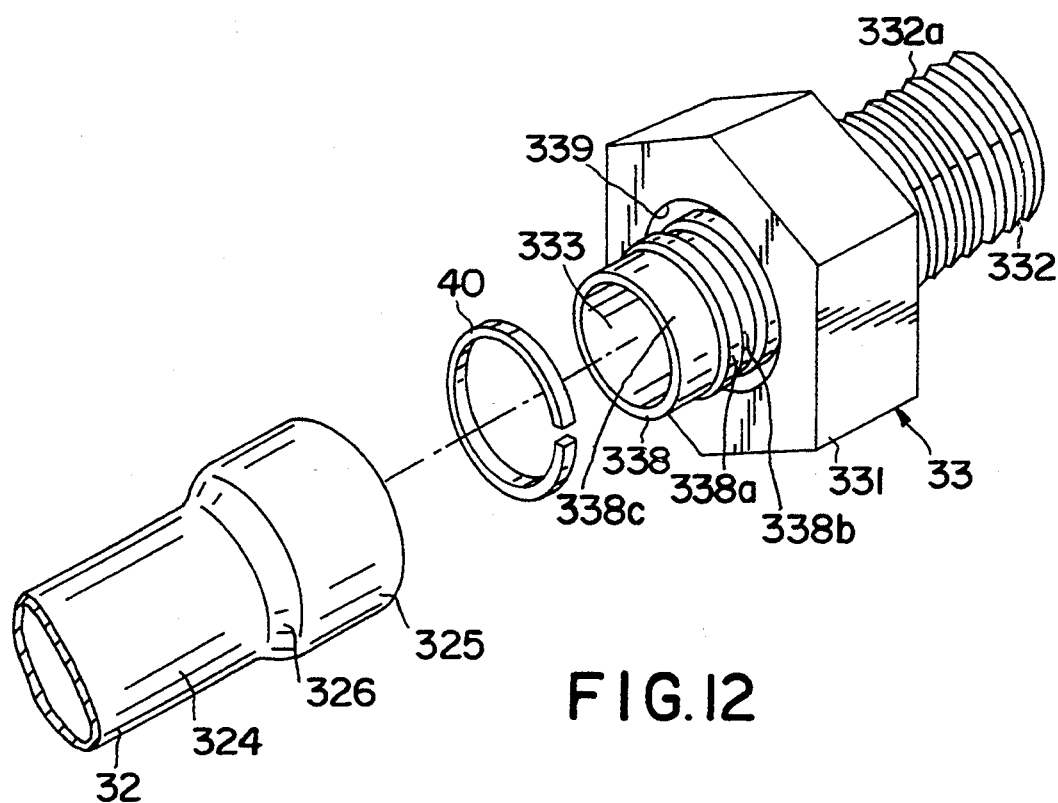
FIG. 12 illustrates an exploded perspective view of a part of a condenser in accordance with a fifth embodiment of the present invention.
Figure 13:
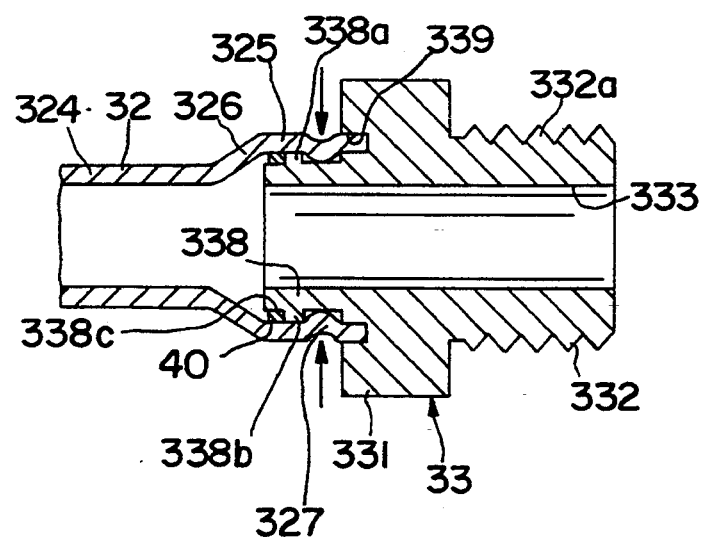
FIG. 13 illustrates a longitudinal sectional view of the part of the condenser shown in FIG. 12.
Figure 14:
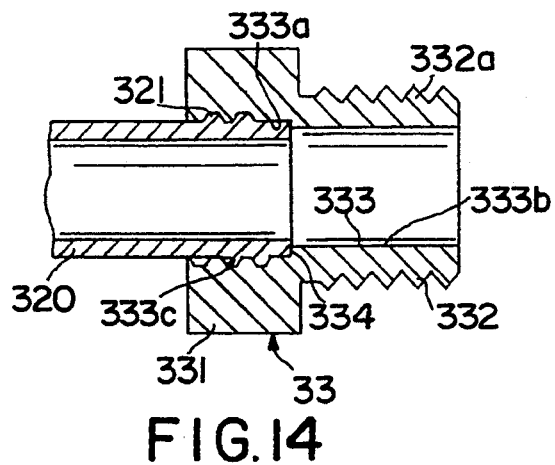
FIG. 14 illustrates a longitudinal sectional view of a part of a condenser in accordance with a sixth embodiment of the present invention.

Referring to FIGS. 12 and 13, a condenser in accordance with a fifth embodiment of the present invention includes union joint 33 having a further cylinder section 338 which axially projects from the proximal end surface of hexagonal prism section 331. Axial annular groove 339 is formed at the proximal end surface of hexagonal prism section 331. An inner diameter of axial annular groove 339 is slightly greater than a diameter of cylinder section 338. Annular projection 338 is formed at an outer peripheral surface of cylinder section 338a about half way along the length of cylinder section 338. A diameter of annular projection 338a is equal to the inner diameter of axial annular groove 339. Hence, annular groove 338b is formed between the proximal end surface of hexagonal prism section 331 and annular projection 338a, and annular step 338c is formed between a proximal end surface of cylinder section 338 and annular projection 338a. Circular straight hole 333 is axially bored through cylinder section 332, hexagonal prism section 331 and cylinder section 338. Circular straight hole 333 is concentric with axial annular groove 339.

Outlet pipe 32 includes relatively small diameter portion 324 and relatively large diameter portion 325 which is formed at an exterior end of relatively small diameter portion 324. Relatively small diameter portion 324 is linked to relatively large diameter portion 325 by slanted shoulder portion 326. The inner diameter of relatively large diameter portion 325 of outlet pipe 32 is slightly greater than the inner diameter of axial annular groove 339 and the outer diameter of annular projection 338a. A length of relatively large diameter portion 325 of outlet pipe 32 is slightly greater than the sum of the length of cylinder section 338 and the depth of axial annular groove 339. The thickness of relatively large diameter portion 325 of outlet pipe 32 is slightly smaller than the width of axial annular groove 339.

A process of temporarily connecting the exterior end of outlet pipe 32 to union joint 33 in accordance with the fifth embodiment is carried out in the following manner. First, C-shaped member 40 is mounted on step portion 338c of cylinder section 338. Then, relatively large diameter portion 325 of outlet pipe 32 is fitted over cylinder section 338 so that the exterior end of relatively large diameter portion 325 of outlet pipe 32 is received in axial annular groove 339. Next, a plurality of crushed portions 327 are formed by crimping a plurality of points (preferably, three points which are equally spaced) on the circumferential portion of relatively large diameter portion 325 which is located over annular groove 338b. After the above-described process is completed, the displacement of C-shaped member 40 from annular step 338c of cylinder section 338 is prevented by slanted shoulder portion 326 of outlet pipe 32. Thus, the process of temporarily connecting the exterior end of outlet pipe 32 to union joint 33 in accordance with the fifth embodiment is carried out.

Furthermore, in the first through fifth embodiments, the exterior end of outlet pipe 32 is brazed to union joint 33 by melting C-shaped member 40 in the brazing process. However, a clad outlet pipe 320 as representatively shown in FIG. 14 can be substituted for C-shaped member 40.

Figure 15:
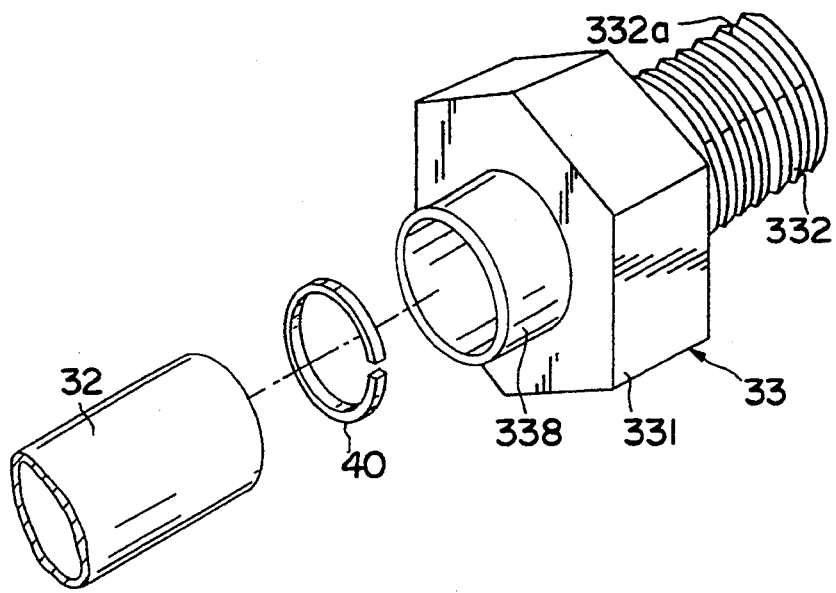
FIG. 15 illustrates an exploded perspective view of a part of a condenser in accordance with a seventh embodiment of the present invention.
Figure 16:
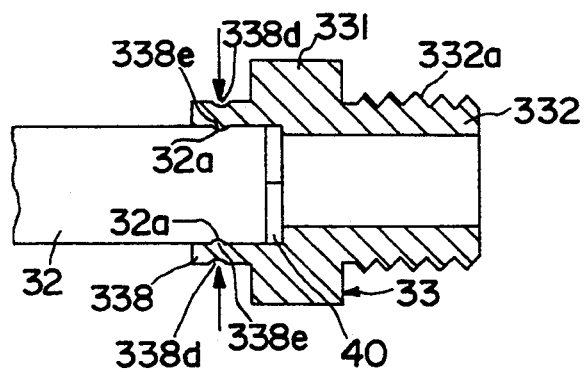
FIG. 16 illustrates a longitudinal sectional view of the part of the condenser shown in FIG. 15.

Referring now to FIGS. 15 and 16, a condenser in accordance with a seventh embodiment of the present invention includes union joint 33 having a further cylinder section 338 which axially projects from the proximal end surface of hexagonal prism section 331. Outer diameter of the outlet pipe 32 is slightly smaller than inner diameter of the cylinder section 338 so that one end of the outlet pipe 32 is slidably disposed within cylinder section 338.

The process of temporarily connecting one end of the outlet pipe 32 to the union joint 33 in accordance with the seventh embodiment is as follows. One end of the outlet pipe 32 is inserted into the cylinder section 338. A plurality of crimped portions 338d are formed by crimping a plurality of points (preferably, three points which are equally spaced) on the circumferential portion of cylinder section 338.

Consequently, a plurality of small projections 338e and small dimples 32a are formed at an inner peripheral surface of the cylinder section 338 and an outer peripheral surface of outlet pipe 32, respectively. The small projections 338e engage with the corresponding small dimples 32a so that the outlet pipe 32 is thus temporarily connected to the union joint 33.

This invention has been described in detail in connection with the preferred embodiments. However, the description is for illustrative purposes only and the invention is not limited thereto. It will be easily understood by those skilled in the art that variations and modifications can be easily made within the scope of this invention as defined by the appended claims.

I claim:

1. A method for temporarily assembling a heat exchanger, the heat exchanger comprising means for conducting a first fluid therethrough so as to exchange heat with a second fluid which externally passes the means for conducting, an inlet port through which the first fluid enters the means for conducting, and an outlet port through which the first fluid exits the means for conducting, at least one of the inlet and outlet ports including a union member and a pipe member having a first and a second end, the first end being secured to the means for conducting, the method for temporarily assembling the heat exchanger comprising the steps of:
   a. providing first coupling means at the second end of the pipe member;
   b. providing second coupling means at the union member, said second coupling means comprising a cylinder section axially projecting from one end surface of said union member;
   c. disposing a brazing member between the second end of the pipe member and the union member;
   d. temporarily coupling the second end of the pipe member and the union member by means of the first and second coupling means, comprising:
      i. inserting the first coupling means into the second coupling means so that the cylinder section overlays the first coupling means; and
      ii. applying a force substantially perpendicular to a longitudinal axis of said cylinder section to create a plurality of points along an outside perimeter of the cylinder section, said cylinder section having an outer diameter less than an outer diameter of said union member.

2. A method for temporarily assembling a heat exchanger comprising a union member and a pipe member having a first end and a second end, the method for temporarily assembling the heat exchanger comprising the steps of:
   a. providing first coupling means at the second end of the pipe member;
   b. providing second coupling means at the union member, said second coupling means comprising a cylinder section axially projecting from one end surface of said union member;
   c. temporarily coupling the second end of the pipe member and the union member by means of the first and second coupling means, comprising the steps of:
      i. inserting one of the first and second coupling means into the other of the first and second coupling means so that the cylinder section overlays the first coupling means; and
      ii. applying a force substantially perpendicular to a longitudinal axis of said cylinder section to create a plurality of points along an outside perimeter of the cylinder section, said cylinder section having an outer diameter less than an outer diameter of said union member.

3. The method of claim 2 further including before the step of temporarily coupling, a further step comprising disposing a brazing member between the pipe member and the union member.

4. The method of claim 3 wherein the step of temporarily coupling comprises the steps of:
   i. inserting the first coupling means into the second coupling means so that the second coupling means overlays the first coupling means; and
   ii. crimping a plurality of points along an outside perimeter of the second coupling means.

5. A method for temporarily assembling a heat exchanger, the heat exchanger comprising a union member and a pipe member, the method for temporarily assembling the heat exchanger comprising the steps of:
   a. providing first coupling means at the pipe member;
   b. providing second coupling means at the union member, said second coupling means comprising a cylinder section axially projecting from one end surface of said union member;
   c. temporarily coupling the pipe member and the union member by means of the first and second coupling means, comprising the steps of:
      i. inserting the first coupling means into the second coupling means so that the cylinder section overlays the first coupling means; and
      ii. applying a force substantially perpendicular to a longitudinal axis of said cylinder section to create a plurality of points along an outside perimeter of the cylinder section, said cylinder section having an outer diameter less than an outer diameter of said union member.

* * * * *